US009723034B2

(12) United States Patent
Yeung et al.

(10) Patent No.: US 9,723,034 B2
(45) Date of Patent: Aug. 1, 2017

(54) ONLINE MEETING SYSTEM AND METHOD

(71) Applicants: Michael Yeung, Nepean (CA); Jim Davies, Amprior (CA)

(72) Inventors: Michael Yeung, Nepean (CA); Jim Davies, Amprior (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 13/713,998

(22) Filed: Dec. 13, 2012

(65) Prior Publication Data

US 2014/0172967 A1 Jun. 19, 2014

(51) Int. Cl.
*G06F 15/16* (2006.01)
*H04L 29/06* (2006.01)
*H04L 12/18* (2006.01)

(52) U.S. Cl.
CPC ........ *H04L 65/403* (2013.01); *H04L 12/1818* (2013.01); *H04L 12/1822* (2013.01)

(58) Field of Classification Search
CPC ....... H04L 65/00; H04L 65/403; H04L 65/60; H04L 12/1818
USPC .................................. 709/204, 205, 217, 219
See application file for complete search history.

(56) References Cited

U.S. PATENT DOCUMENTS

| 6,356,297 | B1* | 3/2002 | Cheng et al. .................... 348/36 |
| 7,778,858 | B1* | 8/2010 | Daily et al. .................... 705/7.15 |
| 8,482,593 | B2* | 7/2013 | Periyannan et al. ........ 348/14.08 |
| 8,769,006 | B2* | 7/2014 | Davidson et al. ............ 709/204 |
| 9,092,533 | B1* | 7/2015 | Demathieu ....... G06F 17/30873 |
| 2007/0265903 | A1* | 11/2007 | Blair et al. ........................ 705/9 |
| 2009/0327425 | A1* | 12/2009 | Gudipaty ............ H04L 65/1093 709/205 |
| 2011/0239120 | A1* | 9/2011 | Krishnakumar et al. ..... 715/733 |
| 2011/0271209 | A1 | 11/2011 | Jones et al. |
| 2011/0283203 | A1* | 11/2011 | Periyannan et al. .......... 715/753 |
| 2012/0082226 | A1* | 4/2012 | Weber ....................... 375/240.12 |
| 2012/0224021 | A1* | 9/2012 | Begeja et al. ............. 348/14.08 |
| 2012/0317487 | A1* | 12/2012 | Lieb et al. .................... 715/730 |
| 2013/0110565 | A1* | 5/2013 | Means et al. ................ 705/7.11 |
| 2014/0250435 | A1* | 9/2014 | Gay et al. ..................... 717/178 |

* cited by examiner

*Primary Examiner* — Liangche A Wang

(57) ABSTRACT

An online system and method are disclosed. An exemplary method includes providing meeting information to a server and/or a participant device prior to the online meeting and streaming audio content to participants during the meeting. The system and method allow online meeting participants to connect to and view meeting information using less network bandwidth during the meeting, compared to traditional online meeting systems and methods.

20 Claims, 3 Drawing Sheets

ONLINE MEETING SYSTEM AND METHOD

FIELD OF THE INVENTION

The present disclosure generally relates to electronic communication systems and methods. More particularly, the disclosure relates to online meeting systems and methods.

BACKGROUND OF THE INVENTION

Online meetings are a convenient means for participants at remote or different locations to communicate with each other and to simultaneously review information, such as electronic documents or presentations, during the meeting. A typical online meeting or web seminar (webinar) allows one or more participants to view documents, video, or other information on devices, such as computers, mobile phones or devices, or other appliances, while simultaneously listening to audio content associated with the information.

Often times, the information viewed by participants during the online meeting is stored on a presenter device, such as computer, or on another device, such as a server, and the information displayed during the online meeting is controlled by the presenter while it is streamed to and viewed by the remote participants. For example, a presenter may provide access to content on his or her device desktop to other online meeting participants during an online meeting and that information may be streamed to participants during the meeting.

Although such real-time sharing of information from the presenter device to other participant devices during a presentation may work relatively well in some cases—for example, when all participants are connected to the presenter's local area network (LAN) using high bandwidth connections, such systems may not work well when one or more participants to the meeting connect to the online meeting using a mobile device with a relatively low bandwidth connection.

The bandwidth limitation of mobile device connections can cause network congestion, which may, in turn, affect the performance of the online meeting system. The congestion may also affect the performance of other applications using or attempting to use the same wireless bandwidth. Thus, online meting participants as well as others may experience sluggish network performance as a result of the online media streaming during the meeting.

In addition, use of mobile bandwidth to stream the information may increase costs associated with the meeting.

Accordingly, improved methods and systems for viewing content during an online meeting, are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

The disclosure provides an online meeting system (e.g., a virtual collaboration room) and method that allow participants to connect to and view meeting information and receive audio content using less network bandwidth during the meeting, compared to traditional online meeting systems. Thus, problems associated with network congestion and poor application performance that might otherwise arise when mobile participants use other online meeting systems can be mitigated or avoided using the method and system described herein.

As set forth in more detail below, an exemplary system and method provide online meeting information to participant devices prior to the online meeting or provide a link to the information prior to the meeting and provides an audio stream or broadcast during the meeting. Various embodiments of the exemplary system and method have several advantages over typical online meeting systems and methods, including requiring less mobile bandwidth during the meeting, requiring less mobile data usage during the meeting, allowing participants to traverse through the information during the meeting (i.e., participants do not necessarily need to view the same information viewed by the presenter, but rather can traverse forward or backward through the information), allowing participants to seamlessly receive updates to the information, and reducing or eliminating the ability of others to spy on the online meeting information.

Figure 1:
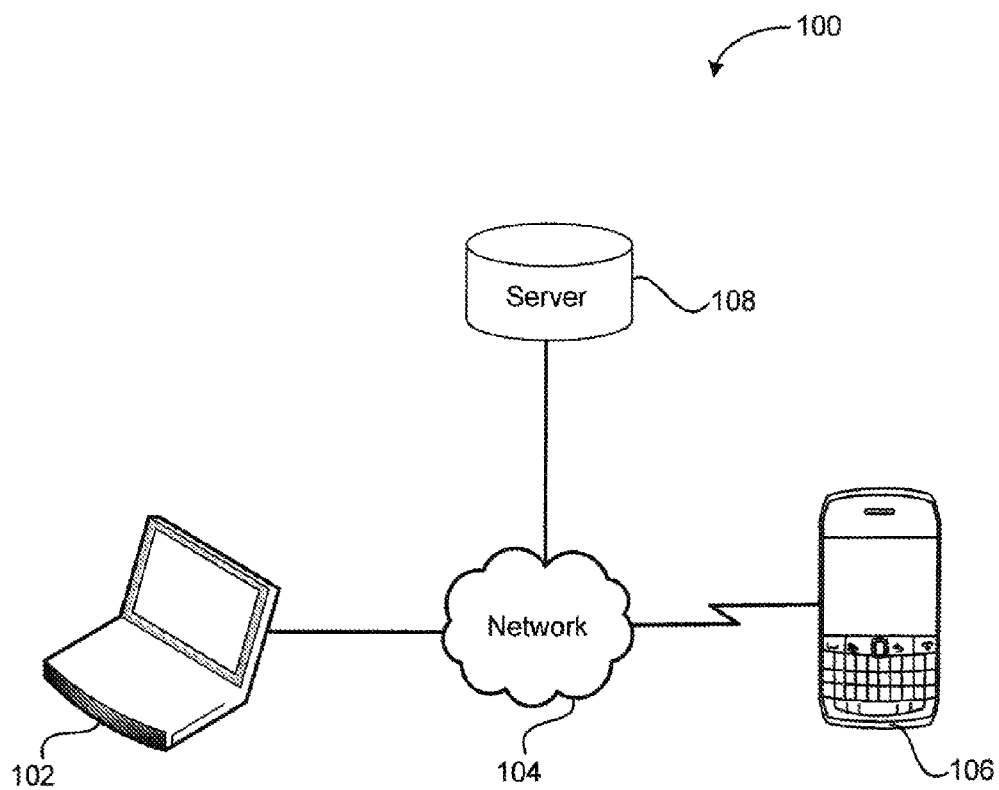
FIG. 1 illustrates an online communication system in accordance with various exemplary embodiments of the disclosure.

FIG. 1 illustrates an online meeting system 100 in accordance with exemplary embodiments of the disclosure. As set forth in more detail below, system 100 may be used to store meeting information on a server and/or send the information to participant devices or clients prior to the meeting. System 100 includes a presenter device 102, a network 104, a participant device 106, and optionally a server 108. Although illustrated as separate devices, as noted in more detail below, the role of presenter and participant may change during a meeting. The exemplary presenter and participant devices are merely for illustration and may be interchanged. Exemplary systems 100 may include any suitable number of devices and servers connected to a network using wired and wireless technology.

Presenter device 102 may be a personal computer, a collaboration device, a smart phone, a tablet computer, or other communication device capable of broadcasting audio information and send meeting information as described herein. Presenter device 102 includes an application or client to stream or broadcast the audio content, to send presentation information to participant device 106 and/or server 108 prior to the meeting, and optionally to synchronize the information viewed by the presenter and the participants during the meeting. As noted in more detail below, when using synchronization, the information may not be synchronized during the entire meeting; however, presenter device 102, in this case, includes an application to periodically transmit synchronization signals to device 106 and/or server 108, such that participants can synchronize to the presentation information when desired.

In accordance with various embodiments of the disclosure, device 102 includes a collaboration application or similar client to allow audio communication between one or more participants (e.g., a presenter using device 102 and a participant using participant device 106) over network 104. The presenter client allows for transmission of audio content from presenter device 102 to other participant devices, while participants view corresponding information stored on server 108 or on their respective devices (e.g., device 106). The client may allow the presenter to access one or more applications to allow editing or manipulation of the information. Device 102 may also include a web browser or similar client, which may be the same or distinct from the collaborative client, to access a meeting management system to send invitations to participants and allow participants to accept, decline, or propose alternative times for the meeting. Such application may further allow access for participants, authorized participants, or others, to view the status of the meeting time negotiation and to contribute to the negotiations.

As noted above, in accordance with exemplary embodiments of the disclosure, the meeting information, whether stored on server 108 or device 106, is indexed, such that the presenter need only send synchronization signals corresponding to locations within the information (e.g., a page number or slide number in a presentation or an elapsed time of a video)—rather than stream the information real time. This allows participants to review the information using less bandwidth during the meeting than would otherwise be required.

Network 104 may include a local area network (LAN), a wide area network, a personal area network, a campus area network, a metropolitan area network, a global area network, or the like. Network 104 may be coupled to device 102 using an Ethernet connection, other wired connections, a Wi-Fi interface, other wireless interfaces, or the like. Network 104 may be coupled to other networks and/or to other devices typically coupled to networks.

Participant device 106 may include any suitable device that connects (e.g., wirelessly or wired) to network 104. Exemplary devices 106 include a personal computer, a collaborative device, a smart phone, a tablet computer, or other communication device capable of receiving audio information and meeting information as described herein. By way of specific examples, device 106 may be a smartphone running Android, iOS, Windows, Symbian, Blackberry OS, Linux operating systems, or similar operating systems, which is capable of running the participant client described in more detail below.

In accordance with exemplary embodiments, participant device 106 includes a participant client or application (e.g., a collaboration, whiteboard or similar application) to allow a participant to listen to audio content and to view and optionally edit or manipulate the information during the meeting. The participant client may receive control signals from server 108 and/or device 102 to indicate a position within the information, which allows participants to synchronize with a particular location within the information. Device 106 may also include a web browser or similar client, which may be the same or distinct from the participant client, to access a meeting management system to send or receive meeting invitations and allow participants to accept, decline, or propose alternative times for the meeting. Such application may further allow access for participants, authorized participants, or others, to view the status of the meeting time negotiation and to contribute to the negotiations.

Each participant need not have the same client or the same device—various devices and clients may be used. Thus, each participant may be able to view the information in different formats.

Although an exemplary presenter client and an exemplary participant client are described in connection with transmission of audio content, the participant client and/or presenter client may be tuned to provide accommodation to participants, such as hearing or sight impaired participants. For example, the clients may be configures to transmit transcribed text corresponding to a presenters spoken words and/or to transmit audio content corresponding to the information.

Device 106 may connect to network 104 using wired or wireless technology, such as WiFi or 3G, 4G, 4G LTE or other suitable mobile device standard.

In accordance with exemplary embodiments of the disclosure, server 108 may be any suitable device capable of receiving information from device 102, storing the information, and allowing access to the information from one or more devices 106 and/or transmitting the information to one or more device 106. By way of particular examples, server 108 may be a private branch exchange (PBX) server, a unified communications server, or the like. Alternatively, server 108 could be part of the collaboration infrastructure in the public cloud (e.g., Google Docs, Dropbox, VMware Horizon, etc.). Such infrastructures can either be accessed through a web browser and/or using a local application agent on the end user's device. When meeting information is stored on server 108 to be accessed by one or more participants during an online meeting, server 108 may include an application, such as a web plug-in, to allow participants to view the information and optionally synchronized to a location within the information as desired and/or modify the information.

When used to store information, server 108 may include an online document sharing application, such as Google Docs, Dropbox, VMware Horizon Data, or the like. Use of such applications allows the presenter and optionally others (e.g., participants) to edit the information prior to the meeting and for all participants to access the revised information without sending the revised document to participants prior to the meeting. In addition, the application may allow information to be modified by the presenter or other participants during the meeting in real time and for such edits to be viewable by all participants.

Figure 2:
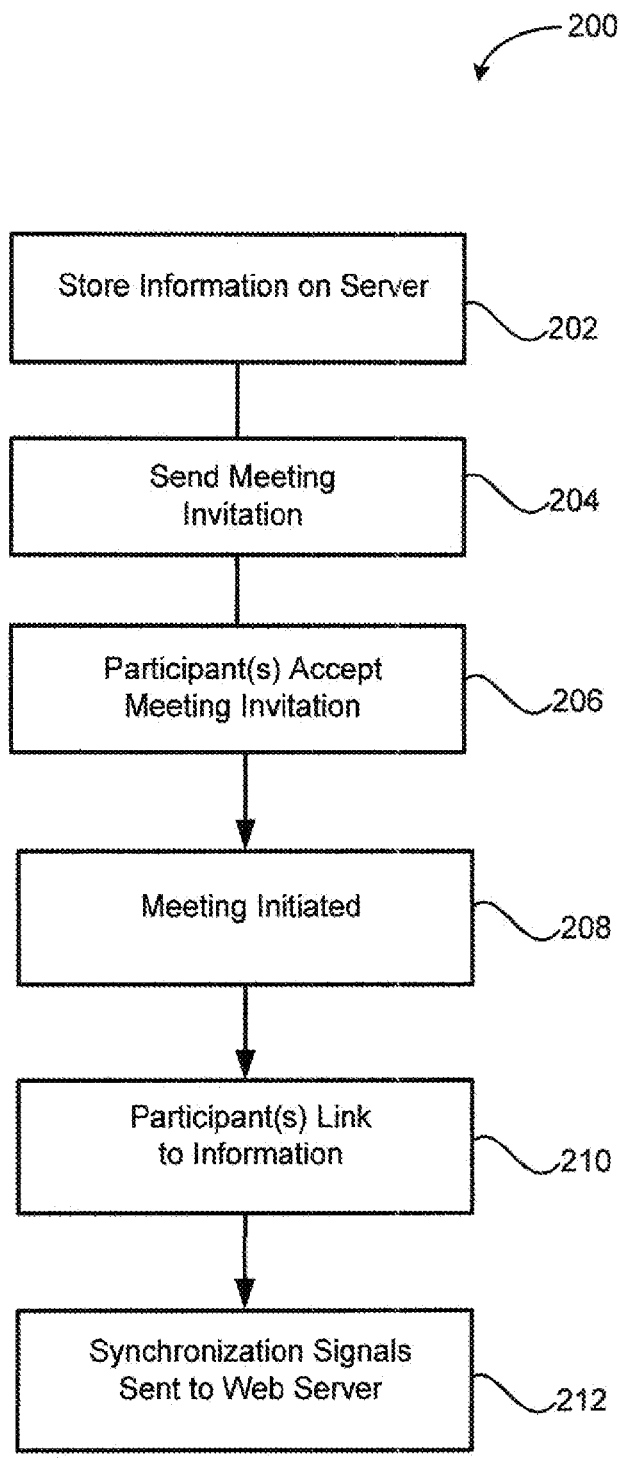
FIG. 2 illustrates an online communication method in accordance with additional exemplary embodiments of the disclosure.

FIG. 2 illustrates a method 200, of conducting an online meeting, in which meeting information is stored (e.g., on server 108) prior to an online meeting, and participants access the information during the meeting using a device (e.g., device 106), in accordance with exemplary embodiments of the disclosure. Method 200 includes the steps of storing information (e.g., a document) on a server (step 202), sending a meeting invitation (step 204), participant(s) accepting meeting invitation (step 206), initiating the online meeting (step 208), participants linking to the information on the server (step 210), and optionally sending synchronizing signals from a presenter device to the server during the meeting (step 212).

During step 202, a presenter or other participant stores information (e.g., a document, a presentation, a video, or the like) on a server (e.g., server 108). As used herein, information means any information that can be electronically stored and that can be accessed by a participant device (e.g., device 106).

Once the information is stored on a server, the presenter or another participant may access and update the information prior to and/or during the online meeting—either by editing the information stored on the server or by editing the information offline and then overwriting or saving as a new version the information to the server. The server online sharing application/web plug in may allow simultaneous/collaborative editing of the stored information. Additionally, and/or alternatively, the server and participant client and server program may be configured, such that the information is automatically synchronized when a participant device assess a network, such as network 104.

To prevent unwanted manipulation of the information, the information may be protected using, e.g., a password or by requiring authentication of participants to the meeting.

During step 204, a participant (e.g., the presenter) sends a meeting notification (e.g., using a client on presenter device 102 to access a meeting management system). The notification may include a link to or location of the information stored on the server, the names of the invitees, the purpose or subject matter of the meeting, and the time and date of the meeting. A presenter client may use a meeting management system to send the invitation and to send periodic reminders for the meeting. The meeting management system may also allow participants to accept, decline, or propose alternative times for the meeting. The presenter and other participants can use their respective clients to view and contribute to the meeting time negotiations.

When a participant accepts a meeting invitation, step 206, the participant may receive a subscription to the information stored during step 202. The subscription allows access to the information on the server and may provide notification to participants of any changes or updates to the information.

During step 208, the online meeting is initiated. Participants may join the meeting by joining a collaboration session, online meeting, or other audio-enabled communication. The meeting may be open, or the participants may be required to provide manual or automatic authentication. Automatic authentication may be obtained when the meeting invitation includes embedded authentication information, as described in co-pending EP application no. 12193862.5, the relevant sections of which are herein incorporated by reference, to the extend they do not conflict with the present disclosure. In this case, when a participant accepts an invitation to join the online meeting (or a reminder to join the meeting), the participant is automatically authenticated and automatically joins the meeting when the meeting begins. Use of such authenticating techniques reduces opportunities for unauthorized participants to join the meeting by providing an efficient means to authenticate only invited participants to the meeting.

In accordance with exemplary embodiments, one participant controls the information at a time. This control may be transferred to any participant to the virtual meeting. The person with control is the "presenter."

During step 210, one or more participants link to or otherwise access the information. As noted above, linking step 210 may be automatic if a participant accepts a meeting invitation and joins the meeting. Otherwise, a participant may select a link to the meeting information (e.g., within a participant or presenter client, other client, e-mail, or calendar application) at the time of the meeting.

During the presentation, synchronization signals may be sent from the presenter device to the server, such that various participants can synchronize to the portion of the information corresponding to the synchronization signal, step 212. As noted above, the participant device may include an application or plug-in to allow the participant to synchronize with the presenter and/or allow the participant to view the information in an asynchronous mode. Additionally or alternatively, the server may include an application plug-in to allow participants to view the information in a synchronous or asynchronous mode. When viewing in an asynchronous mode, the participant client and/or the server plug-in may allow the participant to sync with the presenter. That is, if the participant is viewing the information in asynchronous mode, the participant may select an option on the participant client to sync with a current location of the document.

As noted above, the presenter and participant clients allow the presenter and participant to view the information on their respective devices. The respective presenter and participant clients may also allow the presenter and/or participants to edit and/or control the information during the meeting, such that all participants can review any changes to the information during the meeting. For example, online meeting applications, such as whiteboard applications, may be used to allow the presenter and/or participant to modify the information. In this case, only control signals indicating the change need be sent to the server to modify the information and/or to device 106 to interpret the modifications to the information. Any conflict that may arise during editing by the presenter and/or one or more participants may be resolved using an application on the server and/or manual override action by the presenter.

Documents or other information may be added to the stored information during and/or after the meeting. For example, action item lists, response to action items, and revised information may be stored and archived on the server for later viewing by the participants, a subset of participants, or by others.

Figure 3:
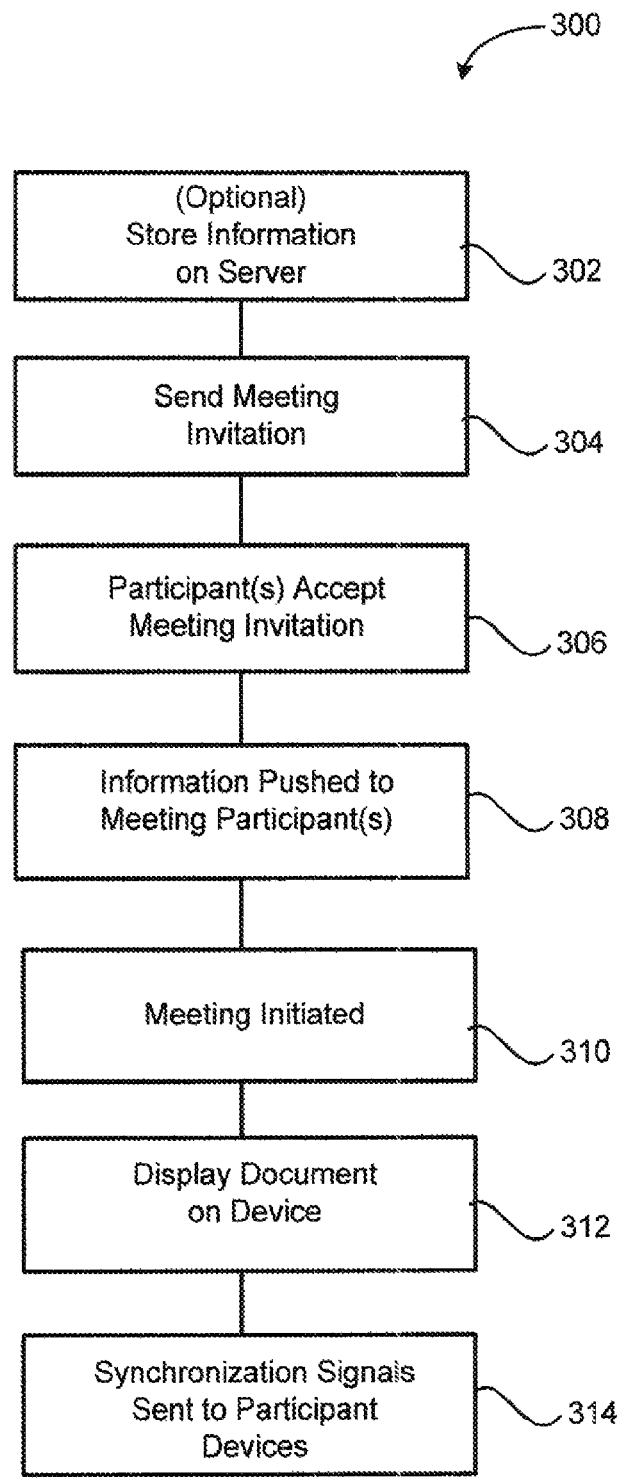
FIG. 3 illustrates an online communication method in accordance with yet additional exemplary embodiments of the disclosure.

FIG. 3 illustrates a method 300, of conducting an online meeting, in accordance with yet additional embodiments of the invention. Method 300 is similar to method 200, except with method 300, information is automatically pushed to participant devices and is optionally stored on a server.

Method 300 includes the steps of optionally storing information on a server (step 302), sending a meeting invitation (step 304), accepting the meeting invitation (step 306), pushing information to participants (step 308), initiating the meeting (step 310), display information on device (step 312), and sending synchronization signals to participants (step 314).

Method 300 may optionally begin with step 302, which includes storing information on a server, such as server 108, in a manner described above in connection with step 202. Alternatively, method 300 may begin with sending a meeting invitation, step 304.

Sending a meeting invitation step 304 includes sending a meeting notice to a desired number of participants. The meeting invitation may include the name of the invitees, the name or subject matter of the meeting, and the time and date of the meeting. Similar to step 204 described above, step 304 may include using a web browser or similar client to access a meeting management system and schedule a meeting. The meeting management system may allow participants to accept, decline, or propose alternative meeting times. Participants and optionally others may view the meeting negotiations and contribute to the negotiations.

In cases when the information is stored on a server, once the meeting invitation is sent, a repository for the information may be created—e.g., on server 108. The repository may also serve as a meeting archive to store meeting information and other information, such as meeting action items, responses to the action items, or documents or other information created during or relating to the meeting. The archive information may be available to only the meeting participants, a subset of the participants, or to others. The meeting invitation may optionally include the information (e.g., when authentication to access the information is not required).

A participant may accept a meeting invitation in a manner similar to the manner used in step 206. When a participant accepts a meeting invitation, the participant may receive a subscription to the information and/or a copy of the information. If the information is stored on the server, the subscription allows access to the information on the server and may provide notification to participants of any changes or updates to the information. Alternatively, the subscription may allow participants to receive updates to their device/client as the updates become available.

During step 308, the information is pushed to a suitable participant client (e.g., on device 106). To avoid or minimize system (e.g., system 100) congestion, the pushing of information may be done on a scheduled basis—e.g., in the evening and/or when low network activity is expected or detected and/or upon request from a participant client. The information may be pushed directly from a presenter device, or the information may be stored on a server and subsequently pushed from the server to the participant devices/clients.

The meeting is initiated during step 210. Similar to step 208, described above, participants may join the meeting by joining a collaboration session, an audio conference or the like, where the presenter and participant clients allow the participant and client to view information as described herein. The meeting may be open, or the participants may be required to provide manual or automatic authentication to join the meeting. Automatic authentication may be obtained as noted above.

Unlike typical collaboration sessions, the information is not streamed to participants during the meeting. Rather, the participants already have the information on their devices/clients, so only synchronization signals are required from the presenter client to indicate the location in the information and/or to indicate where changes in the information have been made. Thus, bandwidth required during the meeting to view the information is significantly reduced and less mobile plan data, and, if applicable, roaming, is required by a mobile client.

When the information is pushed to a participant client, a participant may view the information before, during or after the meeting, step 312. During the meeting, the presenter client sends synchronizing signals to a web plug-in on the server and/or to participant client to allow participants to synchronize the material they are viewing with the information corresponding to the presentation during step 314. The information displayed on the participant device may be synced to the presentation, or the participant may view the information asynchronously. The participant may use a participant interface on the participant client or device to synchronize with the presentation at any time during the online meeting using the synchronization signals sent from the presenter device.

After the meeting has concluded, any changes to the information and any additional information added—e.g., information stored on server 108, may be automatically pushed to participants (including the presenter) clients.

Although methods 200, 300 are illustrated with execution of steps in a particular order, the disclosure is not so limited. For example, various steps may be performed out of the sequence illustrated in FIGS. 2 and 3.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A method for conducting an online meeting, the method comprising the steps of:
   indexing information to provide indexed information;
   prior to initiating the meeting, storing the indexed information on a server;
   sending a meeting invitation comprising one or more of a link and a location of the indexed information to one or more participants;
   initiating the online meeting comprising an audio transmission from a presenter device used by a presenter to one or more participant devices used by the one or more participants;
   using the one or more participant devices to link to the indexed information on the server,
   sending synchronizing signals corresponding to indexed locations within the indexed information from the presenter device to the server during the meeting;
   selecting a synchronizing option on an application on at least one of the one or more participant devices; and
   synchronizing the indexed information viewed on the at least one participant device with the information viewed on the presenter device,
   wherein, during the online meeting, the audio transmission from the presenter device to the one or more participant devices is transmitted independent of the indexed information viewed on the at least one participant device.

2. The method of claim 1, further comprising the step of editing the information prior to the meeting.

3. The method of claim 1, further comprising the step of editing the information during the meeting.

4. The method of claim 1, further comprising the step authenticating one or more participants.

5. The method of claim 1, further comprising the step negotiating a meeting time.

6. The method of claim 1, wherein one or more participants receive a subscription to the information upon acceptance of the meeting invitation.

7. The method of claim 1, wherein at least one of the one or more participants views the information in synchronous mode.

8. The method of claim 1, further comprising the step of archiving the meeting information.

9. The method of claim 1, further comprising the step selecting a synchronizing option on the application on the participant device by the participant.

10. The method of claim 1, further comprising the step synchronizing the information viewed on the participant device with the information viewed by the presenter when a last synchronizing signal was sent to the server.

11. The method of claim 1, further comprising the step downloading the information from the server to the participant device prior to the online meeting.

12. A method for conducting an online meeting, the method comprising the steps of:
   optionally storing information on a server;
   sending a meeting invitation to one or more participants;
   the one or more participants accepting the meeting invitation using one or more participant devices;
   indexing the information to provide indexed information;
   prior to initiating the meeting, pushing the indexed information to the one or more participant devices;
   initiating the online meeting;
   during the online meeting, transmitting audio information from a presenter device to the one or more participant devices and not transmitting the indexed information;
   displaying the indexed information on the one or more participant devices;
   sending synchronization signals corresponding to locations within the indexed information from a presenter device to the server and to a participant device during the meeting;
   selecting a synchronizing option on an application on one or more of the participant devices allowing at least one participant viewing the information in asynchronous mode on at least one participant device to synchronize the indexed information viewed on at least one of the participant devices with the information viewed by the presenter on the presenter device; and
   wherein, during the online meeting, audio information is streamed from a presenter device to the one or more participant devices, while the information previously stored on the one or more participant devices is viewed on the one or more participant devices.

13. The method of claim 12, wherein the method comprises the step of storing information on a server.

14. The method of claim 13, wherein the method further comprises the step of creating a repository for information relating to the meeting on the server.

15. The method of claim 12, wherein the method further comprises the step of one or more participants receiving a subscription to the information.

16. The method of claim 12, wherein updates to the information are automatically pushed to the one or more participant devices.

17. The method of claim 12, wherein the step of pushing information to the one or more participant devices comprises pushing the information during one or more of: a schedule basis, a period of low network activity, and upon request from a participant client.

18. The method of claim 12, wherein the one or more participants view the information in asynchronous mode.

19. The method of claim 12, further comprising the step of archiving the meeting information.

20. An online meeting system comprising:
   a presenter device;
   a network coupled to the presenter device;
   a participant device coupled to the network; and
   optionally a server coupled to the network,
   wherein, prior to the online meeting, information is indexed and stored on one or more of the server and the participant device,
   wherein, during an online meeting, audio information is streamed from the presenter device to the participant device while indexed information stored on the server or the participant device is viewed on the participant device; and
   wherein, the presenter device is configured to send synchronization signals corresponding to indexed locations within the information from a presenter device to the server and to the participant device during the meeting allowing the participant device viewing the indexed information in asynchronous mode to synchronize to the information viewed by the presenter on the presenter device;
   wherein the participant device is configured to have a synchronizing option on an application on the participant device allowing the participant viewing the indexed information in asynchronous mode to synchronize the indexed information viewed on the participant device with the information viewed by the presenter on the presenter device,
   and wherein the audio information is transmitted independent of the information stored on the server.

* * * * *